United States Patent
Choi et al.

(10) Patent No.: US 8,320,712 B2
(45) Date of Patent: Nov. 27, 2012

(54) SATELLITE IMAGE FUSION METHOD AND SYSTEM

(75) Inventors: Myung-Jin Choi, Daejeon (KR); Dong-Han Lee, Daejeon (KR); Hyo-Suk Lim, Daejeon (KR)

(73) Assignee: Korea Aerospace Research Institute (KR)

( * ) Notice: Subject to any disclaimer, the term of this patent is extended or adjusted under 35 U.S.C. 154(b) by 911 days.

(21) Appl. No.: 12/345,240

(22) Filed: Dec. 29, 2008

(65) Prior Publication Data

US 2009/0226114 A1    Sep. 10, 2009

(30) Foreign Application Priority Data

Mar. 7, 2008    (KR) .................. 10-2008-0021541

(51) Int. Cl.
*G06K 9/32* (2006.01)
*G06K 9/36* (2006.01)
*G06K 9/40* (2006.01)

(52) U.S. Cl. ........ 382/294; 382/299; 382/284; 382/254; 382/276

(58) Field of Classification Search .............. 382/284
See application file for complete search history.

(56) References Cited

U.S. PATENT DOCUMENTS

| | | | |
|---|---|---|---|
| 5,949,914 A * | 9/1999 | Yuen .............. | 382/254 |
| 6,011,875 A * | 1/2000 | Laben et al. ........ | 382/276 |
| 7,095,420 B2 * | 8/2006 | Burky et al. ........ | 345/589 |
| 7,298,922 B1 * | 11/2007 | Lindgren et al. ...... | 382/294 |
| 7,826,685 B2 * | 11/2010 | Riley et al. ........ | 382/299 |
| 7,835,594 B2 * | 11/2010 | Riley et al. ........ | 382/299 |
| 7,936,949 B2 * | 5/2011 | Riley et al. ........ | 382/299 |
| 8,078,009 B2 * | 12/2011 | Riley et al. ........ | 382/299 |
| 2004/0141659 A1 * | 7/2004 | Zhang .............. | 382/284 |
| 2007/0175998 A1 * | 8/2007 | Lev ................ | 235/454 |

OTHER PUBLICATIONS

Te-Ming Tu et al., "Best Tradeoff for High-Resolution Image Fusion to Preserve Spatial Details and Minimize Color Distortion", IEEE Geoscience and Remote Sensing Letters, vol. 4, No. 2, Apr. 2007, pp. 302-306.*
Yu Su et al., "Approach to Maximize Increased Details and Minimize Color Distortion for IKONOS and QuickBird Image Fusion", Opt. Eng. 43(12) 3029-3037 (Dec. 2004) pp. 3029-3037.*
Te-Ming Tu et al., "Adjustable intensity-hue-saturation and Brovey transform fusion technique for IKONOS/QuickBird imagery", Optical Engineering, Nov. 2005, vol. 44(11), p. 116201-1-116201-10.*
Te-Ming Tu, et al., "A Fast Intensity-Hue-Saturation Fusion Technique With Spectral Adjustment for IKONOS Imagery", IEEE GRSL, vol. 1, No. 4, pp. 309-312 (2004).

* cited by examiner

*Primary Examiner* — Michelle Entezari
(74) *Attorney, Agent, or Firm* — Cantor Colburn LLP

(57) ABSTRACT

Satellite image fusion method and system are provided. The satellite image fusion method includes matching sizes of a panchromatic image and a multispectral image captured from a satellite image; dividing the panchromatic image and the multispectral image into a plurality of blocks; calculating coefficients to acquire Intensity (I) component image data using pixel values of each block of the multispectral image; and generating fused multispectral image data by applying the acquired I component image data to a fusion algorithm. In the multispectral image fusion, the distortion of the color information can be minimized and the multispectral image data of the high resolution can be attained. In addition, the present invention is applicable to not only the IKONOS images but also other satellite images, and the present image fusion can be carried out fast.

12 Claims, 3 Drawing Sheets

SATELLITE IMAGE FUSION METHOD AND SYSTEM

CROSS-REFERENCE TO RELATED APPLICATIONS

This application claims the benefit under 35 U.S.C. §119(a) to a Korean patent application filed in the Korean Intellectual Property Office on Mar. 7, 2008 and assigned Serial No. 10-2008-0021541, the entire disclosure of which is hereby incorporated by reference.

BACKGROUND OF THE INVENTION

1. Field of the Invention

The present invention relates generally to satellite image fusion method and system. More particularly, the present invention relates to the satellite image fusion method and system for fusing panchromatic image data of a high resolution and multispectral image data of a low resolution using an IHS fusion method.

2. Description of the Related Art

An earth observation technology can play a very important role in a resource exploration and an environment monitoring and management which closely relate to human existence, and is attracting much attention not only for the present but also for the future. The earth observation is carried out by fusing various satellite images. For doing so, it is necessary to enhance a spatial resolution of the images by fusing the images having different spatial resolutions and different spectral resolutions.

Particularly, a panchromatic (black-and-white) optical image which images a spectral reflection energy of a wavelength range of visible light has a high resolution. By contrast, a multispectral image which collects data by segmenting wavelength range from the visible light band to the infrared ray and thermal ray bands per unit wavelength range, disadvantageously degrades the spatial resolution.

In this respect, various methods for fusing the high-resolution panchromatic image and the low-resolution multispectral image have been steadily developed. For example, such various methods include Intensity-Hue-Saturation (IHS), Principle Components Analysis (PCA), arithmetic combinations, wavelets-based fusion, and so on. Particularly, the IHS fusion method is the most recently generalized image fusion scheme. It is known that the IHS is quite suitable for the fusion of the large-capacity high-resolution satellite images. However, the IHS fusion method distorts color information of the multispectral image in fusing process because of a pixel value difference between the panchromatic image and the intensity image. Researches are conducted on diverse methods for fusing the spatial information of the high resolution of the panchromatic image while minimizing the distortion of the color information of the multispectral image.

In the recent paper by Tu et al. titled "A fast intensity-hue-saturation fusion technique with spectral adjustment for IKONOS imagery", IEEE GRSL, vol. 1, no. 4, pp. 309-312 (2004), the distortion of the color information is mitigated by substituting the bands of the multispectral image into Equation 1 which enhances the IHS fusion method.

$$I = \frac{(R + 0.75 \times G + 0.25 \times B + N)}{3} \quad \text{[Equation 1]}$$

In Equation 1, I denotes a pixel value included to the intensity image, and R, G, B, and N denote a Red band component value, a Green band component value, a Blue band component value, and a Near Infrared band component value of the pixel in the multispectral image respectively.

But, Equation 1 acquires two coefficients of 0.75 and 0.25 which are the coefficients of G and B, using the relatively small number (=92) of the IKONOS images. Thus, when all of the IKONOS images are collectively applied to Equation 1, it is difficult to obtain the optimized Intensity (I) value.

In addition, since Equation 1 targets only the IKONOS image, it is hard to apply Equation 1 to other satellite images such as Landset images and SPOT images.

SUMMARY OF THE INVENTION

An aspect of the present invention is to address at least the above mentioned problems and/or disadvantages and to provide at least the advantages described below. Accordingly, an aspect of the present invention is to provide a satellite image fusion method for minimizing distortion of color information in a multispectral image fusion, and reducing a pixel value difference with a panchromatic image by enhancing an IHS fusion.

According to one aspect of the present invention, a satellite image fusion method includes matching sizes of a panchromatic image and a multispectral image captured from a satellite image; dividing the panchromatic image and the multispectral image into a plurality of blocks; calculating coefficients to acquire Intensity (I) component image data using pixel values of each block of the multispectral image; and generating fused multispectral image data by applying the acquired I component image data to a fusion algorithm.

The coefficients may be calculated using a least square method based on the following equation:

$$\min_{a,b,c,d} \|Pan - I\|,$$

where $$I = \frac{(a \times R + b \times G + c \times B + d \times N)}{4}$$

where Pan denotes a pixel value in the panchromatic image, I denotes a pixel value in the I component image, R, G, B, and N denote a red band component value, a green band component value, a blue band component value, and a near infrared band component value of the pixel in the multispectral image respectively, and a, b, c and d denote the coefficients for minimizing a pixel value difference of the I component image and the panchromatic image.

The fusion algorithm may be given by the following equation:

$$F(X) = X + (Pan - I), \text{ where}$$

$$X = R, G, B, N \text{ and } I = \frac{(a \times R + b \times G + c \times B + d \times N)}{4}$$

where F(X) denotes the fused multispectral image.

The coefficients may be calculated using a least square method based on the following equation:

$$\min_{\alpha_i} \|Pan - I\|, \text{ where } I = \frac{\left(\sum_{i=1}^{S} \alpha_i X_i\right)}{S}, \forall i = 1, \ldots, S$$

where Pan denotes a pixel value in the panchromatic image, I denotes a pixel value in the I component image, S denotes the number of bands in the multispectral image, $X_i$ denotes band component values in the multispectral image, and $\alpha_i$ denotes the coefficients for minimizing the pixel value difference of the I component image and the panchromatic image.

The fusion algorithm may be given by the following equation:

$$F(X_i) = X_i + (Pan - I), \text{ where } I = \frac{\left(\sum_{i=1}^{S} \alpha_i X_i\right)}{S}, \forall i = 1, \ldots, S$$

where $F(X_i)$ denotes the fused multispectral image.

The coefficients may be average values of coefficients calculated in the respective blocks.

The matching of the sizes of the panchromatic image and the multispectral image may match the panchromatic image in the size by enlarging the multispectral image.

According to another aspect of the present invention, a satellite image fusion system includes an image processor for matching sizes of a panchromatic image and a multispectral image captured from a satellite image, and dividing the panchromatic image and the multispectral image into a plurality of blocks; an operator for calculating coefficients to acquire Intensity (I) component image data using pixel values of each block of the multispectral image; and an image generator for generating fused multispectral image data by applying the acquired I component image data to a fusion algorithm.

According to yet another aspect of the present invention, a satellite image fusion method includes matching sizes of a panchromatic image and a multispectral image captured from a satellite image; acquiring an Intensity (I) component image corresponding to the multispectral image; and fusing the panchromatic image and the multispectral image by adding a pixel value difference of the panchromatic image and the I component image with pixel values of the multispectral image.

The satellite image fusion method may further include dividing the panchromatic image and the multispectral image matched in the size into a plurality of blocks of a preset size. The acquiring of the I component image and the fusing of the images may be performed on each of the plurality of the blocks.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
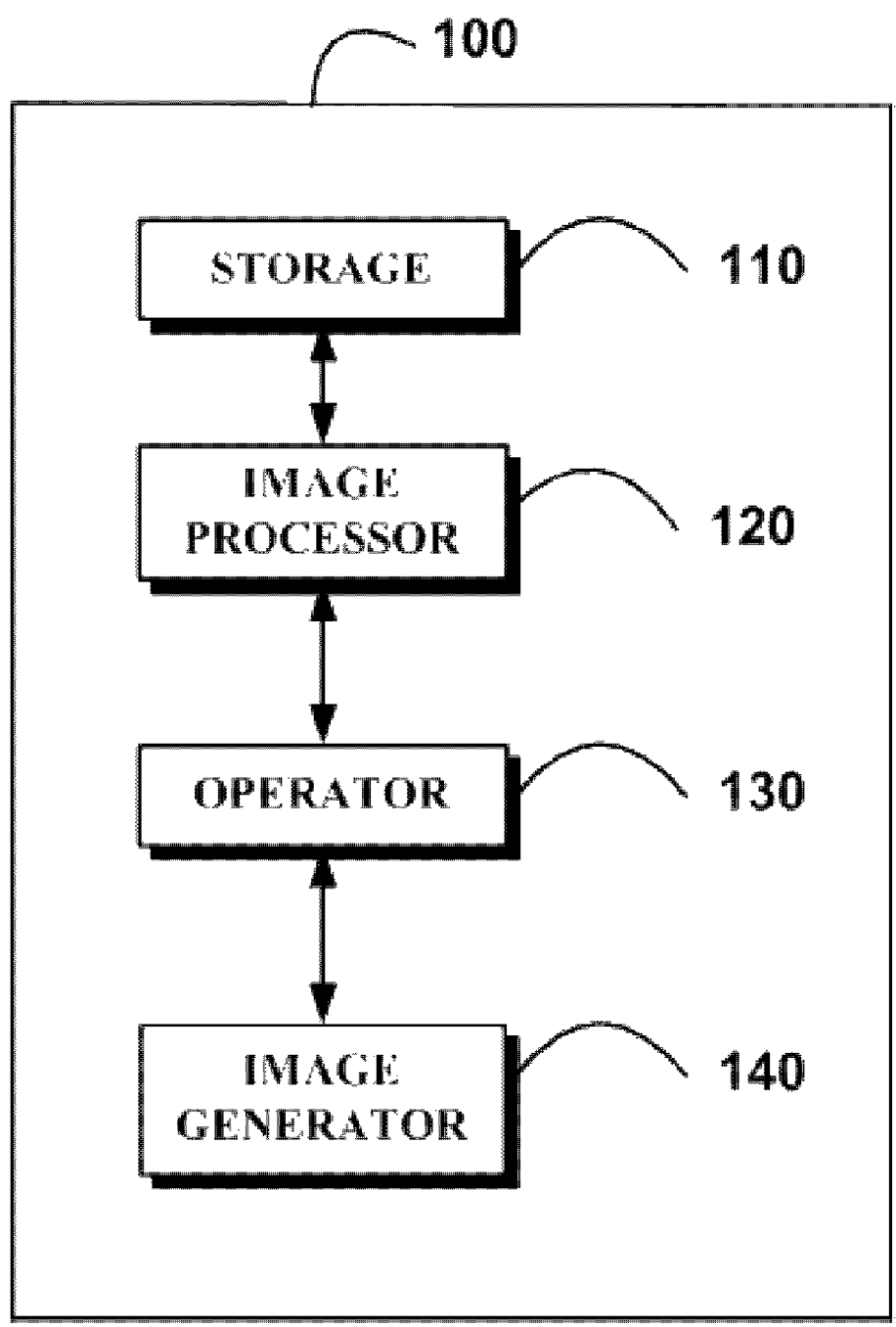
FIG. 1 is a simplified diagram of a satellite image fusion system according to an exemplary embodiment of the present invention.

By referring to FIG. 1, a satellite image fusion system is illustrated according to an exemplary embodiment of the present invention.

FIG. 1 is a simplified diagram of the satellite image fusion system according to an exemplary embodiment of the present invention.

The satellite image fusion system 100 of FIG. 1 includes a storage 110, an image processor 120, an operator 130, and an image generator 140.

The storage 110 contains a panchromatic image and a multispectral image. In general, an earth satellite captures the same surface of the earth in a black-and-white image and a color image separately. The captured black-and-white image is represented as the panchromatic image and the captured color image is represented as the multispectral image.

The panchromatic image represents the spectral reflection energy of the entire visible light wavelength range (0.4~0.7 µm). Since the panchromatic image contains the black-and-white information and has the high spatial resolution due to a high resolving power.

The multispectral image is represented by subdividing the spectral reflection energy from the visible light band to the infrared and thermal ray bands per unit wavelength range. The multispectral image contains color information and has the low spatial resolution due to its low resolving power.

The image processor 120 matches the sizes of the panchromatic image and the multispectral image and divides the panchromatic image and the multispectral image into a plurality of blocks. Since the multispectral image is smaller than the panchromatic image data in the size, their sizes are matched by enlarging the multispectral image.

The operator 130 calculates coefficients to produce the Intensity (I) component image from the multispectral image using the enhanced IHS fusion method. The operator 130 calculates the coefficients for minimizing the pixel value difference between the pixels corresponding to the panchromatic image and the I component image using a least square method. Herein, the pixel value in the panchromatic image corresponds to the intensity.

Herein, the IHS fusion method converts the multispectral image of the three bands which the color information is subdivided to the three light components including the R (red), the G (green), and the B (blue), to the three color components including the Intensity (I), the Hue (H), and the Saturation (S). That is, the IHS fusion method appropriately converts the RGB image in accordance with the visual characteristic of the human. To improve the resolution of the color image, it is general to increase the contrast of the intensity as in the panchromatic image.

Herein, the I component represents the spatial resolution, and the H and S components represent the multispectral reflection characteristics. To avoid the distortion of the color image, it is most effective to increase the intensity as in the panchromatic image. Thus, the operator 130 calculates the optimized I component image to minimize the distortion of the color image.

The operator 130 converts the image data of the wavelength range of the low resolution; that is, the image data of the R band, the G band, the B band, and the Near Infrared (N) band to the image of the I, H S components, and then substitutes the I component image with the high-resolution fused image. That is, the operator 130 minimizes the pixel value difference of the panchromatic image and the I component image through the operation and calculates the optimized I component corresponding to the R band, the G band, the B band, and the N band.

The image generator 140 generates a new multispectral image by applying the I component image to the image fusion algorithm enhanced from the IHS fusion method. The image generator 140 outputs the multispectral image data fused in the high resolution to a display (not shown) connected to outside and allows to confirm the fused image data.

Figure 2:
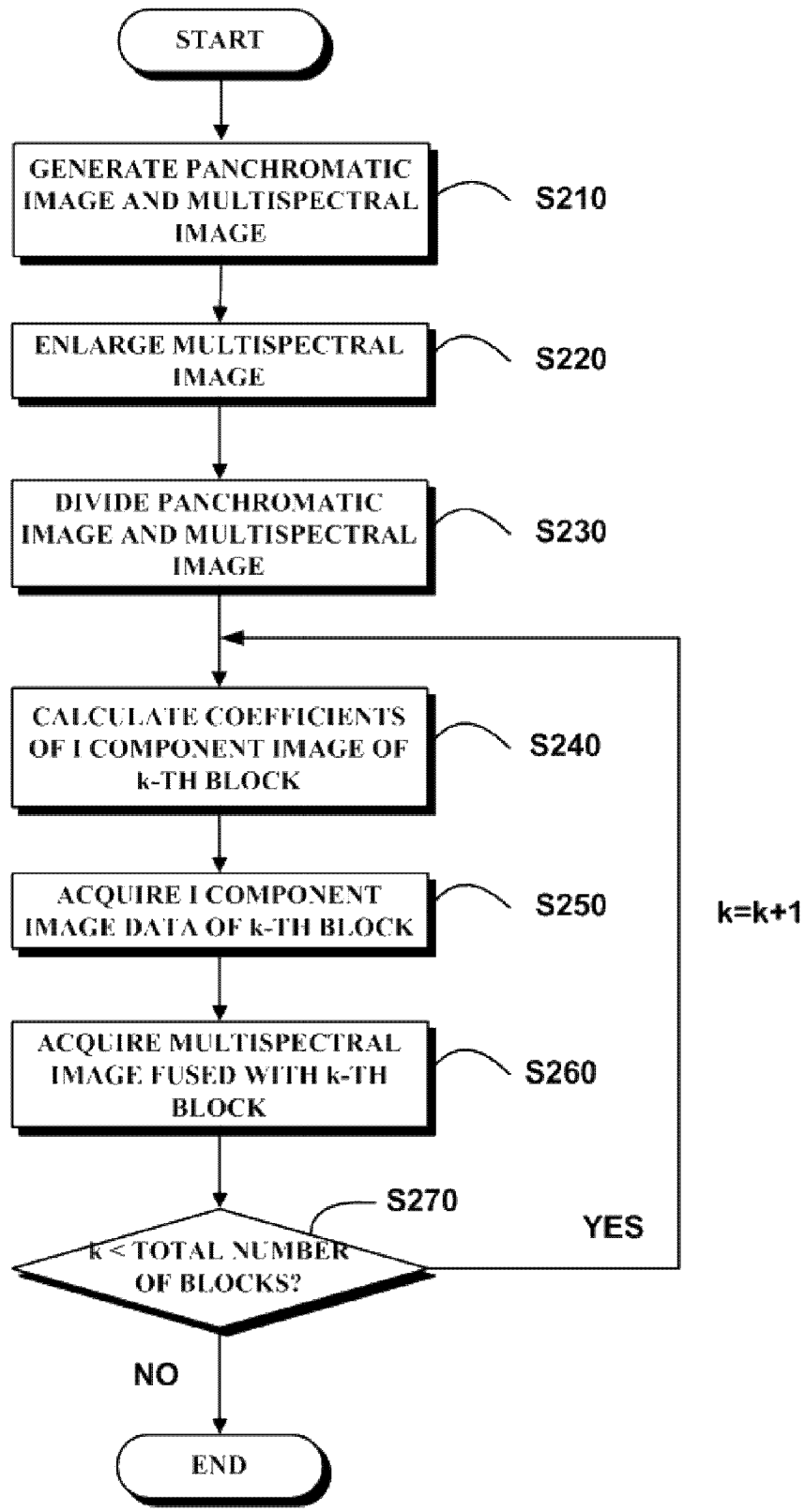
FIG. 2 is a flowchart of a satellite image fusion according to one exemplary embodiment of the present invention.
Figure 3:
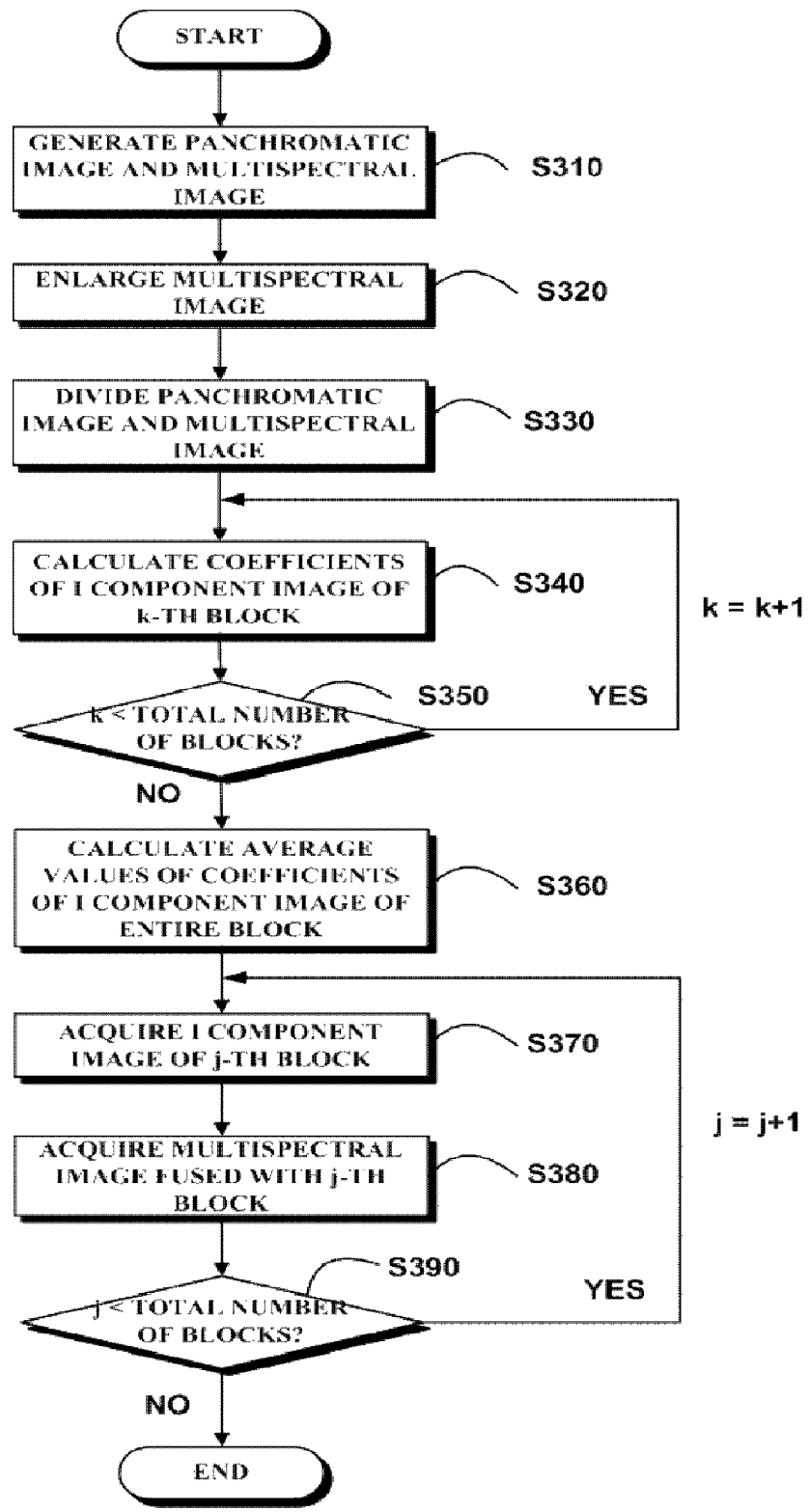
FIG. 3 is a flowchart of a satellite image fusion according to another exemplary embodiment of the present invention.

Now, the satellite image fusion method is explained by referring to FIGS. 2 and 3.

FIG. 2 is a flowchart of the satellite image fusion according to one exemplary embodiment of the present invention.

The panchromatic image and the multispectral image generated by capturing the earth surface at the earth satellite are stored to the storage 110 (S210). Herein, the panchromatic image and the multispectral image capture the same object. The multispectral image has the lower resolution than the panchromatic image and the smaller size than the panchromatic image due to the limited hardware capacity of the earth satellite.

The image processor 120 enlarges the multispectral image in the same size as the panchromatic image using an interpolation method (S220). To sustain the resolution in the enlarged multispectral image, the interpolation method such as bilinear interpolation method and cubic convolution interpolation method can be adopted. One skilled in the art can easily understand the interpolation method and thus shall be omitted here.

The image processor 120 divides the panchromatic image to the blocks of the suitable size and divides the enlarged multispectral image to the blocks of the same size (S230). Usually, the image processor 120 divides the panchromatic image and the multispectral image into (N×M)-ary rectangular blocks.

The operator 130 calculates the coefficients of the I component image data through the multispectral image so as to minimize the difference between the pixel values in the k-th block of the multispectral image and the pixel values in the corresponding k-th block of the panchromatic image (S240). Herein, the k-th block is one of the (N×M)-ary blocks divided.

The operator 130 calculates the coefficients of the I component image data by substituting the R, G, B and N band component bands of the pixels of the k-th block of the multispectral image into Equation 2.

$$\min_{a,b,c,d} \|Pan - I\|, \text{ where} \quad \text{[Equation 2]}$$
$$I = \frac{(a \times R + b \times G + c \times B + d \times N)}{4}$$

In Equation 2, Pan denotes the pixel value in the panchromatic image and I denotes the pixel value in the I component image. R, G, B, and N denote a R band component value, a G band component value, a B band component value, and a N band component value of the pixel in the multispectral image respectively.

With respect to the pixels in the k-th block of the multispectral image, R, G, B and N are substituted to the right-hand side of Equation 2 and its resulting value is generated in the form of a matrix. In other words, the neighbor R component band value, G band component band value, B component band value, and N band component value are substituted as the input values of the matrix and ||Pan−I|| is produced as the output value of the matrix.

Next, the coefficients a, b, c and d for minimizing the pixel value difference of the I component image and the panchromatic image are calculated using a least square method. Herein, the least square method calculates an estimate value for minimizing the sum of error squares. In this embodiment of the present invention, the least square method is used to calculate the coefficients a, b, c and d for minimizing the squared summation of the pixel value difference of the I component image and the panchromatic image.

When the coefficients a, b, c and d are acquired based on Equation 2 as above, the I component image data in the k-th block can be produced (S250).

With respect to the R, G, B, N bands in the k-th block of the multispectral image, the I component image data can be acquired from the coefficients a, b, c and d and R, G, B and N values obtained based on Equation 2.

The fused multispectral image F(x) is calculated by substituting the I component image data to Equation 3 (S260).

$$F(x) = X + (Pan - I), \text{ where} \quad \text{[Equation 3]}$$
$$X = R, G, B, N \text{ and}$$
$$I = \frac{(a \times R + b \times G + c \times B + d \times N)}{4}$$

In Equation 3, F(x) denotes the fused multispectral image and X denotes the R band component band, the G band component value, the B band component value, and the N band component value.

The fused multispectral image F(x) is acquired by substituting the R band component band, the G band component value, the B band component value, and the N band component value X, the pixel value Pan of the panchromatic image data, and the pixel value I of the I component image data into Equation 3.

In more detail, the pixel value of the k-th block of the I component image is subtracted from the pixel value of the k-th block of the panchromatic image, and then the resulting value (Pan−I) is added with the R, G, B, N band component values X of the k-th block. As a result, the multispectral image F(x) of the high resolution with the k-th block images fused can be produced.

The fusion algorithm of the present invention replaces the k-th block of the multispectral image by the high-resolution image by minimizing the pixel value difference from the panchromatic image.

While the four bands of R, G, B and N are applied to Equation 2 and Equation 3, the number of the bands is not limited, which can be given by Equation 4 and Equation 5.

$$\min_{\alpha_i} \|Pan - I\|, \text{ where} \quad \text{[Equation 4]}$$

$$I = \frac{\left(\sum_{i=1}^{S} \alpha_i X_i\right)}{S}, \forall\, i = 1, \ldots, S$$

In Equation 4, Pan denotes the pixel value in the panchromatic image and I denotes the pixel value in the I component image. S denotes the number of the bands in the multispectral image, $X_i$ denotes the respective band component values of the pixels in the multispectral image, and $\alpha_i$ denotes coefficients for minimizing the pixel value difference of the I component image and the panchromatic image.

When the coefficients $\alpha_i$ for minimizing the pixel value difference of the I component image and the panchromatic image are obtained based on Equation 4, the fused multispectral image $F(X_i)$ can be produced by substituting the obtained $\alpha_i$ to Equation 5.

$$F(X_i) = X_i + (Pan - I), \text{ where} \quad \text{[Equation 5]}$$

$$I = \frac{\left(\sum_{i=1}^{S} \alpha_i X_i\right)}{S}, \forall\, i = 1, \ldots, S$$

In Equation 5, $F(X_i)$ denotes the fused multispectral image.

When the image fusion for the k-th block of the multispectral image data is finished, the operator 130 determines whether the image fusion of the entire block is completed or not (S270). When there remains a block not fused in the entire block, the image of the (k+1)-th block is fused by repeating the steps S240 through S260.

As such, when the entire block passes through the image fusion, the multispectral image data corresponding to the respective blocks are replaced by the high-resolution image. The generated color image is output to the display (not shown) connected to the outside.

In the one embodiment of the present invention, the image fusion is conducted on each block of the multispectral image data and the fused blocks are merged with the entire block.

Hereafter, a satellite image fusion method according to another embodiment of the present invention is described.

FIG. 3 is a flowchart of the satellite image fusion according to another exemplary embodiment of the present invention.

In the image fusion method according to another exemplary embodiment of the present invention, the steps S310 through S340 are substantially the same as the steps S210 and S240 of the one embodiment and thus shall not further described for brevity.

When the coefficients a, b, c and d of the I component image of the k-th block of the multispectral image are obtained based on Equation 2, the operator 130 determines whether the k-th block is the last block of the entire block (S350).

When the k-th block is not the last, the steps S340 is repeated to calculate the coefficients a, b, c and d of the I component image data of the (k+1)-th block.

After the coefficients are calculated for all of the blocks, the operator 130 computes average values of the coefficients corresponding to the blocks (S360). That is, the operator 130 computes the average values of the coefficients a, b, c and d obtained in the entire block.

The I component image data in the j-th block of the multispectral image data can be obtained based on Equation 2 (S370). Herein, the j-th block is one of the (N×M)-ary blocks divided. To ease the understanding, the coefficients are computed for the k-th block and the I component image data of the j-th block is calculated.

Next, the image generator 140 can acquire the multispectral image F(X) fused the j-th block based on Equation 3 or Equation 4 (S380), as in the step S260. The production of the multispectral image F(X) fused with the I component image data has been mentioned earlier in one embodiment of the present invention and the overlapping descriptions shall be omitted here.

When the image fusion for the j-th block of the multispectral image data is finished, the image generator 140 determines whether the image fusion of the entire block is completed or not (S390). When there still remains a block not fused in the blocks, the image of the (j+1)-th block is fused by repeating the steps S370 and S380.

As such, after the entire block passes through the image fusion, the multispectral image data corresponding to the respective blocks are replaced by the high-resolution image. The generated color image is output to the display (not shown) connected to the outside.

In another embodiment of the present invention, after the coefficients are calculated for each individual block of the multispectral image data, the average values of the coefficients are applied to the entire block. Therefore, the fused multispectral image data can be attained far more easily and the contrast ratio between the blocks can be reduced.

In the exemplary embodiments of the present invention, while the coefficients for acquiring the I component image data are calculated for the blocks in sequence, the coefficients for the blocks may be calculated at the same time.

As set forth above, in the multispectral image fusion, the distortion of the color information can be minimized and the multispectral image data of the high resolution can be attained. In addition, the present fusion method is applicable to not only the IKONOS images but also other satellite images, and the present image fusion can be carried out fast.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A satellite image fusion method comprising:

matching sizes of a panchromatic image and a multispectral image captured from a satellite image;

dividing the panchromatic image and the multispectral image into a plurality of blocks;

calculating coefficients to acquire Intensity (I) component image data using pixel values of each block of the multispectral image; and generating fused multispectral image data by applying the acquired I component image data to a fusion algorithm, wherein the coefficients are calculated using a least square method based on the following equation:

$$\min_{a,b,c,d} \|Pan - I\|, \text{ where } I = \frac{(a \times R + b \times G + c \times B + d \times N)}{4}$$

where Pan denotes a pixel value in the panchromatic image, I denotes a pixel value in the I component image, R, G, B and N denote a red band component value, a green band component value, a blue band component value, and a near infrared band component value of the pixel in the multispectral image respectively, and a, b, c and d denote the coefficients for minimizing a pixel value difference of the I component image and the panchromatic image, wherein the fusion algorithm is given by the following equation:

$$F(X)=X+(Pan-I), \text{ where } X=R,G,B,N \text{ and}$$

$$I = \frac{(a \times R + b \times G + c \times B + d \times N)}{4}$$

where F(X) denotes the fused multispectral image.

2. The satellite image fusion method of claim 1, wherein the coefficients are average values of coefficients calculated in the respective block.

3. The satellite image fusion method of claim 1, wherein the coefficients are calculated using a least square method based on the following equation:

$$\min_{\alpha_i} \|Pan - I\|, \text{ where } I = \frac{\left(\sum_{i=1}^{S} \alpha_i X_i\right)}{S}, \forall i = 1, \ldots, S$$

where Pan denotes a pixel value in the panchromatic image, I denotes a pixel value in the I component image, S denotes the number of bands in the multispectral image, $X_i$ denotes band component values in the multispectral image, and $\alpha_i$ denotes the coefficients for minimizing the pixel value difference of the I component image and the panchromatic image.

4. The satellite image fusion method of claim 3, wherein the fusion algorithm is given by the following equation:

$$F(X_i) = X_i + (Pan - I), \text{ where}$$

$$I = \frac{\left(\sum_{i=1}^{S} \alpha_i X_i\right)}{S}, \forall i = 1, \ldots, S$$

where $F(X_i)$ denotes the fused multispectral image.

5. The satellite image fusion method of claim 4, wherein the coefficients are average values of coefficients calculated in the respective blocks.

6. The satellite image fusion method of claim 1, wherein the matching of the sizes of the panchromatic image and the multispectral image matches the panchromatic image in the size by enlarging the multispectral image.

7. A satellite image fusion system comprising:
an image processor for matching sizes of a panchromatic image and a multispectral image captured from a satellite image, and dividing the panchromatic image and the multispectral image into a plurality of blocks;
an operator for calculating coefficients to acquire Intensity (I) component image data using pixel values of each block of the multispectral image; and
an image generator for generating fused multispectral image data by applying the acquired I component image data to a fusion algorithm
wherein the coefficients are calculated using a least square method based on the following equation:

$$\min_{a,b,c,d} \|Pan - I\|, \text{ where } I = \frac{(a \times R + b \times G + c \times B + d \times N)}{4}$$

where Pan denotes a pixel value in the panchromatic image, I denotes a pixel value in the I component image, R, G, B and N denote a red band component value, a green band component value, a blue band component value, and a near infrared band component value of the pixel in the multispectral image respectively, and a, b, c and d denote the coefficients for minimizing a pixel value difference of the I component image and the panchromatic image, wherein the fusion algorithm is given by the following equation:

$$F(X)=X+(Pan-I), \text{ where } X=R,G,B,N \text{ and}$$

$$I = \frac{(a \times R + b \times G + c \times B + d \times N)}{4}$$

where F(X) denotes the fused multispectral image.

8. The satellite image fusion system of claim 7, wherein the coefficients are average values of coefficients calculated in the blocks.

9. The satellite image fusion system of claim 7, wherein the coefficients are calculated using a least square method based on the following equation:

$$\min_{\alpha_i} \|Pan - I\|, \text{ where } I = \frac{\left(\sum_{i=1}^{S} \alpha_i X_i\right)}{S}, \forall i = 1, \ldots, S$$

where Pan denotes a pixel value in the panchromatic image, I denotes a pixel value in the I component image, S denotes the number of bands in the multispectral image, $X_i$ denotes the band component values in the multispectral image, and $\alpha_i$ denotes the coefficients for minimizing the pixel value difference of the I component image and the panchromatic image.

10. The satellite image fusion system of claim 9, wherein the fusion algorithm is given by the following equation:

$$F(X_i) = X_i + (Pan - I), \text{ where}$$

$$I = \frac{\left(\sum_{i=1}^{S} \alpha_i X_i\right)}{S}, \forall i = 1, \ldots, S$$

where $F(X_i)$ denotes the fused multispectral image.

11. The satellite image fusion system of claim 10, wherein the coefficients are average values of coefficients calculated in the blocks.

12. The satellite image fusion system of claim 7, wherein the image processor matches the panchromatic image in the size by enlarging the multispectral image.

* * * * *